United States Patent
Kim et al.

(10) Patent No.: US 12,407,664 B2
(45) Date of Patent: Sep. 2, 2025

(54) METHOD FOR MESSENGER SERVICE AND APPARATUS THEREFOR

(71) Applicant: SAMSUNG SDS CO., LTD., Seoul (KR)

(72) Inventors: Jongseong Kim, Seoul (KR); Hwanyeol Choi, Seoul (KR); Kiman Kim, Seoul (KR); Dohyeong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 176 days.

(21) Appl. No.: 18/353,151

(22) Filed: Jul. 17, 2023

(65) Prior Publication Data

US 2024/0114018 A1 Apr. 4, 2024

(30) Foreign Application Priority Data

Sep. 29, 2022 (KR) ........................ 10-2022-0124437

(51) Int. Cl.
*H04L 9/40* (2022.01)
*H04L 51/00* (2022.01)

(52) U.S. Cl.
CPC .............. *H04L 63/08* (2013.01); *H04L 51/00* (2013.01)

(58) Field of Classification Search
CPC ..... H04L 63/08; H04L 51/00; H04L 12/1827; H04L 51/212; H04L 51/04; H04L 63/105;
(Continued)

(56) References Cited

U.S. PATENT DOCUMENTS 9,978,040 B2 * 5/2018 Lee ..................... G06Q 10/103
11,310,295 B1 4/2022 Demmer et al.
(Continued)

FOREIGN PATENT DOCUMENTS

EP 2 560 134 A1 2/2013
KR 10-2009-0001748 A 1/2009
(Continued)

OTHER PUBLICATIONS

European Office Action issued on Sep. 19, 2024 in corresponding European Patent Application No. 23 184 406.9. (6 pages in English).
(Continued)

*Primary Examiner* — Benjamin M Thieu
(74) *Attorney, Agent, or Firm* — NSIP Law (57) ABSTRACT

A method and device for providing a closed messenger service to a second authority-level user includes receiving, from a first terminal, a first identity of a first authority-level user who invited the second authority-level user, a second identity of the second authority-level user, and information identifying a workspace to which the second authority-level user is invited, transmitting an authorization request to an approver when it is determined that authorization for the second authority-level user is required on the basis of the first identity, and performing a workspace member registration procedure based on the second identity and the information identifying the workspace when receiving an authorization confirmation to the authorization request from a second terminal.

19 Claims, 3 Drawing Sheets

(58) Field of Classification Search
CPC ..... H04L 63/20; H04L 67/1046; H04L 63/10; H04L 63/108; G06Q 50/50
See application file for complete search history.

(56) References Cited

U.S. PATENT DOCUMENTS

| | | | |
|---|---|---|---|
| 2007/0239755 A1* | 10/2007 | Mahoney | G06Q 10/107 707/999.102 |
| 2009/0307605 A1* | 12/2009 | Ryan | G06Q 10/10 715/751 |
| 2012/0054639 A1* | 3/2012 | Shi | H04L 12/1822 709/205 |
| 2019/0327296 A1 | 10/2019 | Hayashi | |
| 2021/0255744 A1 | 8/2021 | Sullivan et al. | |
| 2022/0086109 A1* | 3/2022 | Ramirez | H04L 51/56 |

FOREIGN PATENT DOCUMENTS

| WO | WO 2021/188157 A1 | 9/2021 |
|---|---|---|
| WO | WO 2021/188157 A8 | 9/2021 |

OTHER PUBLICATIONS

Finnell, Katherine. "Learn how to invite external users to Slack workspaces" [2021} *Unified Communications* Sep. 8, 2021. pp. 1-10.

Slack. "Managing Slack at scale: How to streamline guest access" Slack Sep. 3, 2019. pp. 1-9.

Extended European Search Report Issued on Feb. 29, 2024, in Counterpart European Patent Application No. 23184406.9 (4 Pages in English).

* cited by examiner

METHOD FOR MESSENGER SERVICE AND APPARATUS THEREFOR

CROSS-REFERENCE TO RELATED APPLICATIONS

This application claims priority to Korean Patent Application No. 10-2022-0124437 filed on Sep. 29, 2022, in the Korean Intellectual Property Office, the entire contents of which are hereby incorporated by reference in its entirety.

BACKGROUND

1. Field

The present disclosure relates to a messenger service and, more specifically, to a method for providing a closed messenger service to a second authority-level user and an apparatus therefor.

2. Description of Related Art

A closed messenger service is generally provided only to first authority-level users of a company, instead of second authority-level users. Since the second authority-level user cannot use the closed messenger service, the closed messenger service cannot be provided to the second authority-level user even if collaboration with the second authority-level user is necessary, thereby lowering work efficiency when collaborating with the second authority-level user. In order to solve this problem, although collaboration with the second authority-level user through an external messenger service provided to the public, the external messenger service may cause serious security problems such as easy leaking of collaboration content and the like.

SUMMARY

The present disclosure is to provide a method for effectively providing a closed messenger service to a second authority-level user and an apparatus therefor.

In one general aspect, there is a method for providing a restricted-access messaging service in a server, wherein first-authority-level users are authorized to access the messaging service and are able to request access to the messaging service for second-authority-level users who are not otherwise authorized to access the messaging service, and the method includes: receiving, from a first terminal, (i) an invitation from a first-authority-level user inviting a second-authority-level user to join a workspace of the messaging service, (ii) a first identity identifying the first-authority-level user who, (iii) a second identity identifying the second-authority-level user, and (iv) information identifying the workspace to which the second-authority-level user is invited by the first-authority-level user; determining, based on the first identity, that authorization is required for the invitation to grant the second-authority-level user access to the workspace, and based thereon transmitting an authorization request to an approver; receiving, from a second terminal, an authorization confirmation granted by the authorizer based on the authorization request; and based on the authorization confirmation, the second identity, and the information identifying the workspace, performing a workspace member registration procedure that registers the second identity as a member of the workspace.

The performing the workspace member registration procedure may include transmitting a link for member registration with the closed messenger service using the information about the second-authority-level user responsive to the second-authority-level user being determined to not be registered as a member of the closed messenger service on the basis of the second identity.

The method may further include determining not to transmit a link for member registration of second-authority-level user with the closed instant messaging service based on determining, according to the second identity, that the second-authority-level user is registered as a member of the closed messenger service.

The performing the workspace member registration procedure may further include receiving, from a third terminal, member information of the closed messenger service related to the second-authority-level user, and registering the second-authority-level user as a member of the closed messenger service by storing the received member information in the database.

The second identity may include an e-mail address or phone number of the second-authority-level user.

The method may further include receiving information about a usage period of the workspace from the first terminal, and the performing a workspace member registration procedure may include: registering the second-authority-level user as a member of the workspace in a database, and storing the second identity in association with the information about a usage period of the workspace in a database of the messenger service.

The method may further include determining whether the workspace member registration procedure can be performed without requiring authorization from the authorizer based on the first identity.

The performing the workspace member registration procedure may include transmitting a workspace invitation completion notification using second identity or the first identity.

The method may further include deleting the second-authority-level user from members of the workspace responsive to the usage period of the workspace expiring.

The method may further include deleting the second-authority-level user from members of the workspace responsive to the workspace expiring.

The method may further include deleting the second-authority-level user from members of the workspace responsive receiving an expel request of the second-authority-level user from the first terminal.

The method may further include deleting the second-authority-level user from members of the workspace responsive to receiving an exit request of the workspace from a third terminal.

The method may further include deleting an account of the second-authority-level user from the closed messenger service responsive to the second-authority-level user being determined not to be registered as a member of another workspace on the basis of the second identity, and transmitting an account deletion notification using the second identity.

The method may further include deleting the second identity from the database.

In another general aspect, a device includes: one or more processors; and a memory storing instructions configured to cause, when executed by the one or more processors, the device to implement operations of providing a closed messaging service to a second-authority-level user, the messaging service including workspaces including a target workspace, and wherein the operations include: receiving, from a first terminal, a first identity identifying a first-authoritylevel user who invited the second-authority-level user, a second identity identifying the second-authority-level user, and information identifying the target workspace to which the second-authority-level user is invited; transmitting an authorization request to an approver responsive to determining that authorization for the second-authority-level user is required, wherein the determining that authorization for the second-authority-level user is required is based on the first identity; and responsive to receiving, from a second terminal, an authorization confirmation of the authorization request, performing a workspace member registration procedure, with respect to the target workspace, based on the second identity and based on the information identifying the workspace.

The performing the workspace member registration procedure may include transmitting a link for member registration with the closed messenger service using the second identity information responsive to the second-authority-level user being determined to not be registered as a member of the closed messenger service.

The operations may further include receiving information about a usage period of the workspace from the first terminal, and the performing the workspace member registration procedure may include: registering the second-authority-level user as a member of the target workspace in a database; and storing the second identity and the information about a usage period of the workspace in association with each other in a database of the messenger service.

The operations may further include determining not to perform the workspace member registration procedure without the authorization request responsive to determining that the first-authority-level user is not authorized to register second-authority-level users with the messenger service.

The performing the workspace member registration procedure may further include transmitting a workspace invitation completion notification using the first identity or the second identity.

In another general aspect, a computer-readable storage medium stores instructions configured to cause, when executed by one or more processors, a device including the one or more processors to implement operations of providing a closed messenger service to a second-authority-level user, wherein the operations include: receiving, from a first terminal, a first identity identifying a first-authority-level user of the messenger service who invited the second-authority-level user, a second identity identifying the second-authority-level user, and also receiving from the first terminal information identifying a workspace of the messenger service to which the second-authority-level user is invited; transmitting an authorization request to an approver when it is determined that authorization for the second-authority-level user is required on the basis of the first identity; and responsive to receiving an authorization confirmation of the authorization request from a second terminal, performing a workspace member registration procedure based on the second identity and based on the information identifying the workspace.

BRIEF DESCRIPTION OF THE DRAWINGS

The accompanying drawings are included as part of the detailed description to help understanding of the present disclosure, and describe embodiments and technical features of the present disclosure together with the detailed description.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In this specification, a messenger refers to a computer program that provides real-time chatting based on text or voice or enables immediate exchange of data such as photos, videos, computer files, and the like over the Internet. The messenger may be referred to as other terms such as "instant messaging", "instant messenger", or the like. A messenger service refers to providing a software application or managing and/or operating a server and/or database such that users can chat or exchange data through a messenger. A messenger or messenger service provided for communication and collaboration between first authority-level users within a company is referred to as a "closed messenger" or "closed messenger service". A closed messenger or closed messenger service may be referred to as other terms such as an "in-house messenger" or an "in-house messenger service".

The messenger provides a conversation channel through which users may exchange text messages or data with each other. The conversation channel may be referred to as a "channel" for short, and may be referred to as other terms such as a "conversation room", a "chat room", or the like. The chat channel may be provided as a user interface in the form of a window to a user terminal, and users may exchange text messages or data through the chat channel, and previously exchanged text messages or data may be displayed on the chat channel. A user may create one or more chat channels in the messenger for collaboration on a specific task, and a virtual work space implemented by a computer to create and/or use one or more chat channels in the messenger for collaboration on a specific task is referred to as a workspace. For example, the workspace may be understood as a lower concept of a messenger service and a higher concept of a chat channel. If members are registered in the workspace, one or more chat channels may be created and/or used between members, and the workspace may include one or more chat channels created between workspace members.

In this specification, an insider refers to a person belonging to a certain company or institution, and an outsider refers to a person who does not belong to the company or institution. For example, in the case of a company, an insider refers to a person who is a first authority-level user of the company and given first authority-level user identification information (or first authority-level user ID information), and an outsider refers to a person who is a second authority-level user other than the first authority-level user of the company and is not given first authority-level user identification information (or first authority-level user ID information). The first authority-level user identification information refers to information for identifying a first authority-level user within the company and may be expressed using, for example, numbers, letters, or a combination thereof, which may be referred to as various terms such as an employee number, a first authority-level user identification number, or the like.

A second authority-level user may be identified using an e-mail address or phone number (e.g., a mobile phone number), instead of the first authority-level user identification information, and the e-mail address or phone number of the second authority-level user may be configured by an insider (e.g., a first authority-level user of the company) when inviting the second authority-level user to the workspace.

The first authority-level user refers to a user who does not require an authorization procedure for creating and leaving a workspace or channel of a closed messenger service, and the second authority-level user indicates a user who is registered through an authorization procedure when creation of a workspace or channel of a closed messenger service is impossible.

The closed messenger service is generally provided only to the first authority-level users of the company and not provided to the second authority-level users. Since the second authority-level user cannot use the closed messenger service, the closed messenger service cannot be provided to the second authority-level user even if collaboration with the second authority-level user is necessary, thereby lowering work efficiency when collaborating with the second authority-level user. In order to solve this problem, although collaboration with the second authority-level user through an external messenger service provided to the public, the external messenger service may cause serious security problems such as easy leaking of collaboration content and the like.

Proposed Method of Present Disclosure

The present disclosure proposes a method of effectively providing a closed messenger or closed messenger service to second authority-level users. More specifically, the present disclosure proposes a method of restrictively providing a closed messenger or messenger service to second authority-level users through authorization procedures for the second authority-level users and configuring a usage period when collaboration with the second authority-level users is required.

More characterfully, the present disclosure proposes the following method such that a limited messenger service may be provided to a second authority-level user who needs collaboration only when specific conditions are satisfied in a closed messenger service.

(1) A first authority-level user who needs to collaborate with a second authority-level user in a company may specify an e-mail address and/or phone number (e.g., a mobile phone number) of the second authority-level user and a usage period thereof for each workspace and invite the second authority-level user to a specific workspace of the closed messenger service. Since the closed messenger service is provided to the second authority-level users for each workspace (on a per-workspace basis), for example, even if a second authority-level user is invited and/or authorized for a first workspace and is registered as a member of the first workspace, the second authority-level user, in order to use a chat channel of a second workspace, must be registered as a member of the second workspace through invitation and/or authorization for the second workspace. Therefore, even in the case where the second authority-level user is registered as a member of the first workspace, if the second authority-level user is not registered as a member of the second workspace, the second authority-level user cannot use the chat channel of the second workspace.

(2) Invitation to a specific workspace may be authorized by an approver according to security configuration for each company. The security configuration may include information indicating whether or not authorization is required when inviting a second authority-level user for each user first authority-level user identification information (or first authority-level user ID information) of the insider (e.g., a first authority-level user of the company) and may be stored/managed in a server providing the closed messenger service or in a database connected to the server when operating. The security configuration may be stored/managed in a database for managing members of the closed messenger service and/or in the same database as a database for managing the workspace, or may be stored/managed in a separate database. When the approver's authorization is required according to the security configuration, an authorization request may be transmitted through e-mail to, for example, the approver's e-mail address, and the authorization request may include a user interface by which the approver may select authorization or rejection. After receiving the authorization request, the approver may perform authorization confirmation or authorization rejection to the authorization request by selecting/inputting authorization or rejection. The approver is a person, among the first authority-level users, who authorizes the creation of a specific workspace. For example, the approver may be a head of the department to which the insider making an invitation for the workspace belongs or may be a person designated by the company.

(3) If authorization for the second authority-level user (or invitation of the second authority-level user) is unnecessary or if required authorization is completed by an approver according to the security configuration for each company, a member registration link for the closed messenger service may be sent to the e-mail address or phone number of the second authority-level user.

(4) When the second authority-level user receiving the member registration link completes member registration through the link, the second authority-level user having completed the member registration may be registered as a member in the requested workspace. When the second authority-level user completes member registration for the closed messenger service, an account of the second authority-level user for the closed messenger service may be created, and the second authority-level user may access the closed messenger service through the created account. Since the closed messenger service is provided to second authority-level users on a per-workspace basis, the second authority-level user may use only the workspace for which the second authority-level user is registered as a member even if the second authority-level user access the closed messenger service, and the workspace for which the second authority-level user is not registered as a member may not be displayed to the second authority-level user or its use may be restricted.

An account may be created after completing the member registration in the closed messenger service, the second authority-level user may be registered as a member in a database for management of members of the closed messenger service, and member information and/or account information of the second authority-level user may be stored in the database for management of members of closed messenger service. The member information and/or account information of the second authority-level user may be stored in the same database as that of the insiders (e.g., first authority-level users of the company) or in a separate database. In the case where the member information and/or account information of the second authority-level user is stored in the same database as that of the insiders, the second authority-level user and the insiders may be distinguished from each other using user type information in the database. Since the second authority-level user is not given the first authority-level user identification information (or first authority-level user ID information) as described above, the second authority-level user may be identified using an e-mail address or phone number (e.g., a mobile phone number) so as to be distinguished from the insiders. In addition, the insider and the second authority-level user may be distinguished in that the second authority-level user who is not invited to the workspace of the closed messenger service or has not completed member registration is not registered as a member in the database for management of members of the closed messenger service, whereas the insider is registered as a member in the database for management of members of the closed messenger service.

If the second authority-level user is invited and/or authorized for the workspace, the second authority-level user may be registered as a member in a database for management of the workspace, and information (e.g., an e-mail address or phone number) about the second authority-level user and information about a workspace usage period may be stored in the database for management of the workspace. The database for management of the workspace may be included as part of the database for management of members of the closed messenger service or may be a separate database. Similarly, the member information and/or account information of the second authority-level user may be stored in the same database as that of the insider or in a different database therefrom.

(5) The closed messenger service may be provided to the second authority-level user only for the workspace for which the second authority-level user is registered as a member only during an authorized usage period. The usage period may be configured independently for respective workspaces. For example, a first usage period may be configured when the second authority-level user is invited to a first workspace, and a second usage period may be configured when the second authority-level user is invited to a second workspace. The first usage period and the second usage period may be configured to be the same or different from each other.

(6) If the workspace usage period expires or forcibly expires, or if an insider makes a request for expelling the second authority-level user from the workspace, or if the second authority-level user voluntarily requests to exit the workspace, the second authority-level user may be processed to exit the workspace, and in the case where the second authority-level user is not registered as a member of another workspace, the account of the second authority-level user for the closed messenger service may be deleted, thereby preventing potential security problems. In the case where the second authority-level user is registered as a member of another workspace, the account of the second authority-level user for the closed messenger service may be maintained, instead of being deleted. The workspace exit process may also be performed for each workspace, so that the second authority-level user may create and/or use a chat channel as a member in the workspace from which the exit process is not performed. For example, if the second authority-level user is registered as a member in a second workspace even in the case where a workspace exit process of the second authority-level user is completed for a first workspace, the second authority-level user may create and/or use a chat channel as a member in the second workspace.

Figure 1:
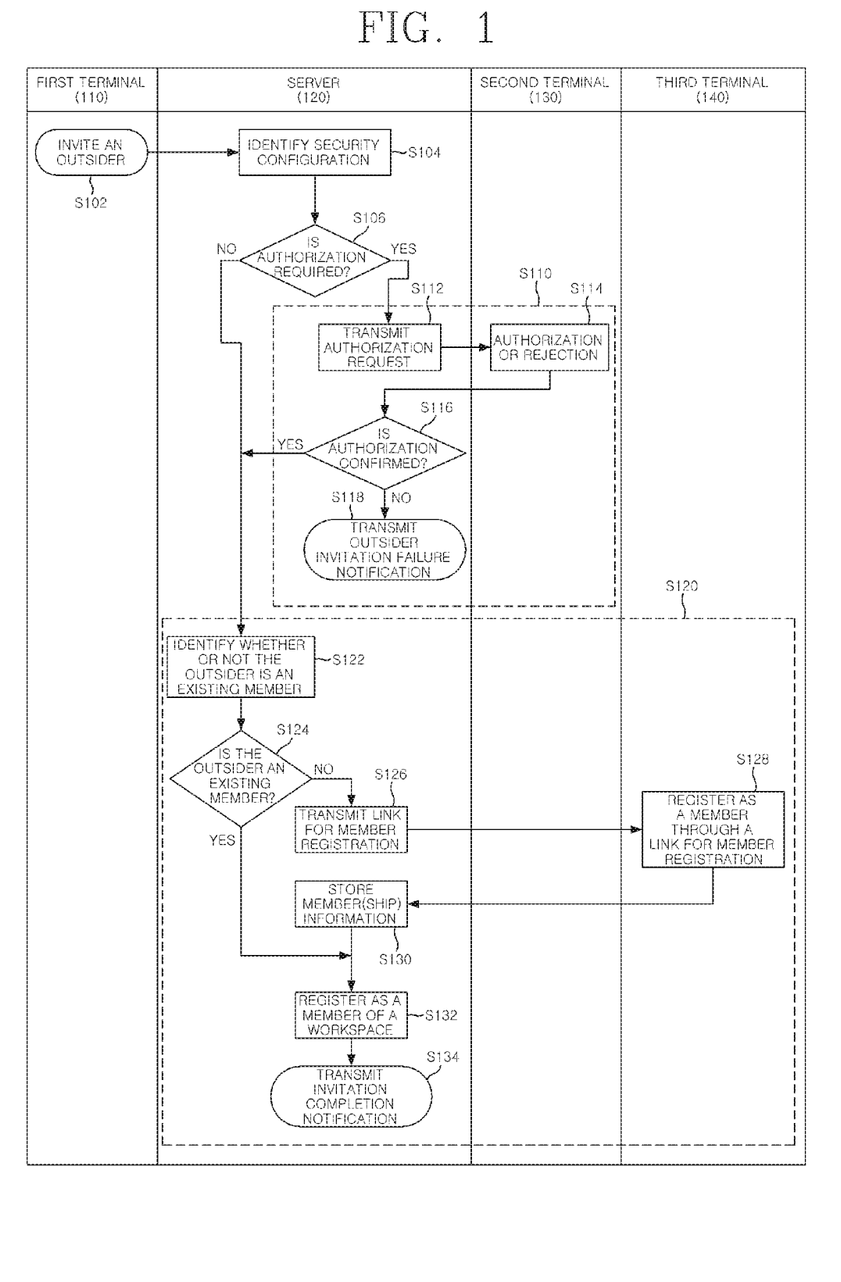
FIG. 1 illustrates a flowchart of a second authority-level user invitation process according to a proposed method of the present disclosure.

FIG. 1 illustrates a flowchart of a second authority-level user invitation process according to a proposed method of the present disclosure. The proposed method of the present disclosure is not limited to the process illustrated in FIG. 1 and may be modified such that some elements are excluded or modified from the process illustrated in FIG. 1 or new elements are added thereto.

Referring to FIG. 1, the second authority-level user invitation process according to the proposed method of the present disclosure may be performed on the basis of a server device 120 providing a closed messenger service, and the server device 120 may communicate with a first terminal device 110, a second terminal device 130, and a third terminal device 140 during operation. In this specification, the server device and the terminal device may be briefly referred to as a "server" and a "terminal", respectively.

For collaborating with a second authority-level user, the first terminal 110 may receive, from an insider (e.g., a first authority-level user of a corresponding company) who wishes to invite the second authority-level user to a closed messenger service, at least one piece of information about the insider who invited the second authority-level user (to a closed messenger service or a workspace), information about the second authority-level user to be invited (to a closed messenger service or a workspace), information about a workspace to which the second authority-level user is invited, and information about a usage period of the workspace, and transmit a request for invitation of the second authority-level user together with the received information to the server 120 (S102).

For example, the information about an insider may include first authority-level user identification information (or first authority-level user ID information) of the insider who invited the second authority-level user and/or information about an e-mail address and/or phone number (e.g., a mobile phone number) thereof. For example, the information about the second authority-level user may include information about an e-mail address and/or phone number (e.g., a mobile phone number) of the second authority-level user to be invited. For example, the information about a workspace may include information (e.g., a workspace name, a workspace ID, etc.) for identifying the workspace to which the second authority-level user is invited from a database for workspace management. For example, the information on a workspace usage period may include information about an available period (e.g., days, months, years, etc., or a combination of at least two or more thereof) after member registration in the workspace and/or an expiry date (e.g., date, month, year, etc., or a combination of at least two or more thereof).

The server 120 may receive, from the first terminal 110, at least one piece of the information about the insider (e.g., a first authority-level user of a corresponding company), the information about the second authority-level user, the information about the workspace, and the information about the usage period of the workspace along with a request for invitation of the second authority-level user, identify security configuration regarding whether or not authorization for the second authority-level user is required when the insider invites the second authority-level user on the basis of the information about the insider (S104), and determine whether or not authorization for the second authority-level user is required (S106). For example, the security configuration may include information indicating whether or not authorization is required when inviting a second authority-level user for each piece of first authority-level user identification information (or first authority-level user ID information) of the insider, and the security configuration may be stored/managed in the server 120 or a database operatively connected to the server 120. In this example, the server 120 may identify the security configuration using the first authority-level user identification information (or first authority-level user ID information) of the insider and determine whether or not authorization is required for the second authority-level user using the information indicating whether or not authorization is required.

If it is determined that authorization for the second authority-level user is required on the basis of the information about the insider (S106), the server 120 may perform an authorization procedure (S110). In the authorization procedure (S110), if it is determined that authorization for the second authority-level user is necessary on the basis of the information about the insider (S106), the server 120 may transmit an authorization request to an approver using the information about the approver (S112), and the authorization request may be transmitted to the approver through the second terminal 130. The security configuration may further include information about, for example, the approver in relation to information about the insider. As a more specific example, the security configuration may include first authority-level user identification information (or first authority-level user ID information), information about an e-mail address and/or a phone number (e.g., a mobile phone number), and the like of the approver for each first authority-level user identification information (or first authority-level user ID information) of the insider, and the server 120 may transmit the authorization request to the approver through a closed messenger using the first authority-level user identification information (or first authority-level user ID information) of the approver or transmit the authorization request to the approver through e-mail or text messages using the e-mail address or phone number of the approver. For example, the approver may be a head of the department to which the insider (e.g., a first authority-level user of a corresponding company) making an invitation to the second authority-level user belongs or may be a person designated by the company.

In the authorization procedure (S110), the second terminal 130 may receive an authorization or rejection to the authorization request from the approver and transmit an authorization confirmation or authorization rejection to the server 120 (S114). The second terminal 130 may transmit an authorization confirmation to the server 120 when an authorization for the authorization request is received, and transmit an authorization rejection to the server 120 when a rejection to the authorization request is received.

In the case of receiving an authorization confirmation from the second terminal 130 (S116), the server 120 may perform a workspace member registration procedure (S120) for the second authority-level user (on the basis of the information about the second authority-level user and the information about the workspace received in S102). On the other hand, in the case of receiving an authorization rejection from the second terminal 130 (S116), the server 120, based on the information about the insider (e.g., a first authority-level user of a corresponding company), may transmit a second authority-level user invitation failure notification (or a notification of authorization rejection to second authority-level user invitation) to the insider who requested invitation of the second authority-level user (S118), and the second authority-level user invitation failure notification (or a notification of authorization rejection to second authority-level user invitation) may be transferred to the insider who requested the invitation of the second authority-level user through the first terminal 110. In this case, the closed messenger service is not provided to the second authority-level user, the second authority-level user is not registered in the workspace, and the second authority-level user invitation process ends. For example, the server 120 may transmit a second authority-level user invitation failure notification (or a notification of authorization rejection to second authority-level user invitation) through a closed messenger using the first authority-level user identification information (or first authority-level user ID information) of the insider or transmit a second authority-level user invitation failure notification (or a notification of authorization rejection to second authority-level user invitation) through e-mail or text messages using the e-mail address or phone number (e.g., a mobile phone number) of the insider.

If it is determined that authorization for the second authority-level user is not required on the basis of the information about the insider (e.g., a first authority-level user of a corresponding company) (S106), the server 120 may perform a workspace member registration procedure (S120) for the second authority-level user without an authorization procedure (S110) (or transmitting an authorization request to the approver (S112)). Even when authorization confirmation is received from the second terminal 130 (S116), the server 120 may perform a workspace member registration procedure for the second authority-level user (S120).

In the workspace member registration procedure (S120), the server 120, based on the information (e.g., the e-mail address and/or phone number, etc.) about the second authority-level user received in S102, may identify whether or not the second authority-level user is already registered as a member of the closed messenger service (or whether or not the second authority-level user is an existing member of the closed messenger service) (S122). For example, member information of the closed messenger service may be stored/managed in a database for management of members of the closed messenger service, and the server 120 may identify whether or not at least some of the information about the second authority-level user received in S102 is registered as member information of the closed messenger service. The database for management of members of the closed messenger service may be a database including a database for workspace management or may be a separate database.

If it is determined that the second authority-level user is not already registered as a member of the closed messenger service (or is not an existing member of the closed messenger service), based on the information about the second authority-level user (S124), the server 120 may transmit a link for member registration of the closed messenger service using the information about the second authority-level user (S126), and the link for member registration of the closed messenger service may be transmitted to the second authority-level user through the third terminal 140. For example, the information about the second authority-level user may include information about an e-mail address and/or phone number (e.g., a mobile phone number) of the second authority-level user, and the server 120 may transmit the link for member registration of the closed messenger service through e-mail or text messages using the e-mail address or phone number of the second authority-level user. A link refers to connection information that enables movement to an Internet site, computer file, or character string, and for example, the link may be a hyperlink that enables movement to a member registration procedure of the closed messenger service.

The third terminal 140 may receive a selection or input (e.g., a mouse click or screen touch) to the link from the second authority-level user, provide the second authority-level user with an Internet site for member registration of the closed messenger service, receive information for member registration, and transmit the information for member registration to the server 120 (S128). The information for member registration may be abbreviated as member information.

If the second authority-level user completes member registration of the closed messenger service through the third terminal 140, the server 120 may register the second authority-level user as a member of the closed messenger service and store the information about the second authority-level user received in S102 and/or the member information received from the third terminal 140 (S130). For example, the member information may be stored in a database for management of members of the closed messenger service.

After storing the information about the second authority-level user and/or the member information (S130), or if it is determined that the second authority-level user is already registered as a member of the closed messenger service (or is an existing member of the closed messenger service) on the basis of the information about the second authority-level user (S124), the server 120 may register the second authority-level user as a member of a corresponding workspace on the basis of the information about the second authority-level user and the information about the workspace received in S102, and store the information about the second authority-level user, the information about a usage period, and the like received in S102 (S132). For example, the server 120 may register the second authority-level user as a member of the workspace in a database for workspace management and, in addition thereto, store information about the second authority-level user (e.g., an e-mail address and/or phone number, etc.), the information about the usage period (e.g., days, months, years, expiry date, etc., or a combination of two or more thereof), and the like.

After completing the workspace member registration, the server 120 may transmit a workspace invitation completion notification for the second authority-level user (or a notification indicating that the second authority-level user invitation has been successfully completed) to the insider (e.g., a first authority-level user of a corresponding company) who requested the invitation of the second authority-level user and/or the second authority-level user (S134). For example, the workspace invitation completion notification may be transferred to the insider who requested the invitation of the second authority-level user through the first terminal 110 and/or transferred to the second authority-level user through the third terminal 140. For example, the workspace invitation completion notification may be transmitted to the insider through a closed messenger, e-mail, or text messages using information (e.g., first authority-level user identification information, an e-mail address, a phone number, etc.) about the insider received in S102. For example, the workspace invitation completion notification may be transmitted to the second authority-level user through e-mail or text messages using the information about the second authority-level user (e.g., an e-mail address, a phone number, etc.) received in S102.

Figure 2:
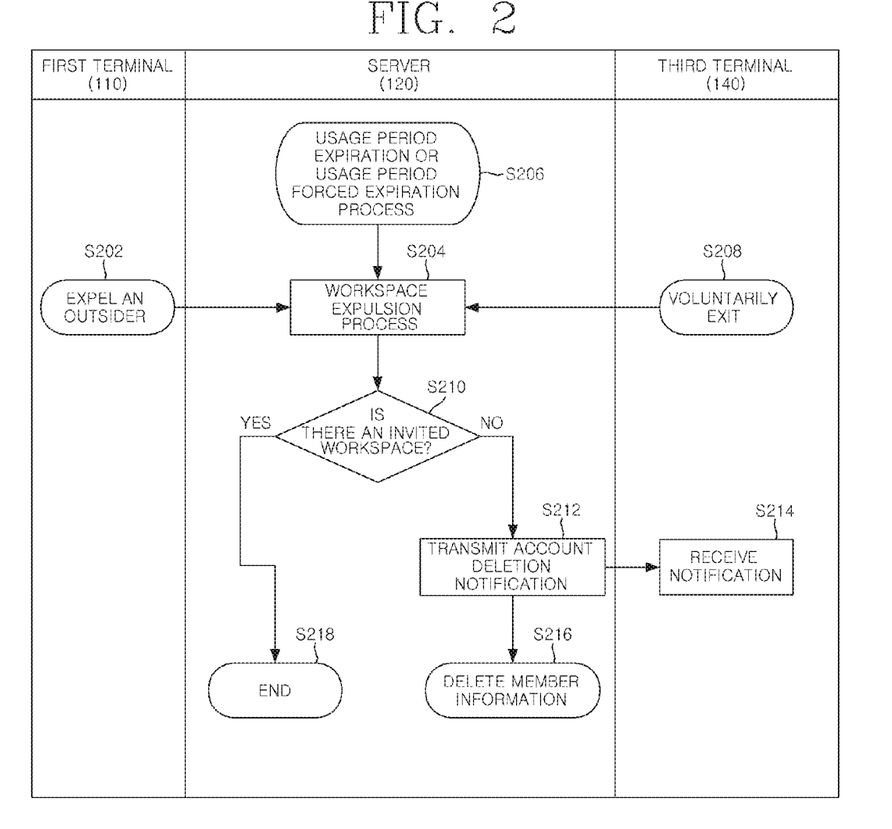
FIG. 2 illustrates a flowchart of a second authority-level user invitation cancellation process according to a proposed method of the present disclosure.

FIG. 2 illustrates a flowchart of a second authority-level user invitation cancellation process according to a proposed method of the present disclosure. The proposed method of the present disclosure is not limited to the process illustrated in FIG. 2 and may be modified such that some elements are excluded or modified from the process illustrated in FIG. 2 or new elements are added thereto.

Referring to FIG. 2, the second authority-level user invitation cancellation process according to the proposed method of the present disclosure may be performed on the basis of a server device 120 providing a closed messenger service, and the server device 120 may communicate with a first terminal device 110 and a third terminal device 140 during operation. In this specification, the server device and the terminal device may be briefly referred to as a "server" and a "terminal", respectively.

In order to cancel collaborating with a second authority-level user, the first terminal 110 may receive, from an insider (e.g., a first authority-level user of a corresponding company) who wishes to expel the second authority-level user from a workspace, a second authority-level user expel request and transmit the second authority-level user expel request to the server 120 (S202). For example, the first terminal 110 may receive a second authority-level user to be expelled and a second authority-level user expel request through a menu of a closed messenger and transmit, to the server 120, information about the second authority-level user to be expelled and information about an exit-targeted workspace along with the second authority-level user expel request. For example, the information about the second authority-level user to be expelled may include information about an e-mail address and/or phone number (e.g., a mobile phone number) of the second authority-level user.

The server 120 may receive the second authority-level user expel request from the first terminal 110 and perform a workspace exit process on the second authority-level user (S204). Specifically, the server 120 may receive the information about the second authority-level user to be expelled and the information about the exit-targeted workspace along with the second authority-level user expel request from the first terminal 110 and, based on the information about the second authority-level user to be expelled and the information about the exit-targeted workspace, perform a workspace exit process on the second authority-level user (S204). For example, the workspace exit process (S204) may include deleting the second authority-level user from members of the workspace in the database for workspace management or adjusting the usage level or access authority of the second authority-level user in the workspace. The second authority-level user may be determined by the information about the second authority-level user to be expelled, and the workspace may be determined by the information about the exit-targeted workspace. In addition, for example, the workspace exit process (S204) may further include deleting the information about the second authority-level user, the information about the usage period, etc. (e.g., see the description related to S132 in FIG. 1) from the database for workspace management.

The workspace exit process (S204) may be performed when the workspace usage period of the second authority-level user expires or when the workspace usage period of the second authority-level user forcibly expires (by a server administrator, etc.) (S206), as well as when a request is received from an insider (e.g., a first authority-level user of a corresponding company) (S202). For example, the server 120 may determine whether or not the workspace usage period has expired on the basis of information about the usage period in a database for workspace management and, if it is determined that the workspace usage period has expired, perform a workspace exit process (S204). As another example, in the case where the workspace usage period forcibly expires, the server 120 may perform a workspace exit process (S204) on the basis of the forced expiration configuration.

Alternatively, the workspace exit process (S204) may be performed even in the case where the second authority-level user voluntarily wants to leave the workspace (S208). For example, the third terminal 140 may receive an exit request from the second authority-level user through a closed messenger menu and transmit, to the server 120, information about the second authority-level user who made the exit request and information about an exit-targeted workspace along with the exit request. For example, the information about the second authority-level user who made the exit request may include information about an e-mail address and/or phone number (e.g., a mobile phone number) of the second authority-level user. The server 120 may receive, from the third terminal 140, the information about the second authority-level user who made the exit request and the information about the exit-targeted workspace together with the exit request and perform the workspace exit process (S204) for the second authority-level user on the basis of the information about the second authority-level user and the information about the workspace.

Then, the server 120 may determine whether or not there is another invited workspace other than the workspace from which the second authority-level user was processed to exit on the basis of the information about the second authority-level user (S210).

If it is determined that there is no other invited workspace (S210), the server 120 may delete the account of the second authority-level user for the closed messenger service on the basis of the information about the second authority-level user and transmit an account deletion notification to the second authority-level user (S212), and the second authority-level user may receive the account deletion notification through the third terminal 140 (S214). For example, the information about the second authority-level user may include information about an e-mail address and/or phone number (e.g., a mobile phone number) of the second authority-level user, and the server 120 may transmit an account deletion notification through e-mail or text messages using the e-mail address or phone number of the second authority-level user.

Thereafter, the server 120 may delete member information of the second authority-level user (e.g., see descriptions related to S122 and S130 in FIG. 1) from the database for management of members of the closed messenger service (S216). The database for management of members of the closed messenger service may be the same database as the database for workspace management or may be a separate database.

If it is determined that there is another invited workspace (S210), the server 120 may terminate the second authority-level user invitation cancellation process (S218). In this case, the server 120 may transmit a second authority-level user invitation cancellation completion notification or a workspace exit process completion notification to the second authority-level user on the basis of, for example, the information about the second authority-level user. In addition, for example, the server 120 may also transmit a second authority-level user invitation cancellation completion notification or a workspace exit process completion notification to the insider who requested to expel the second authority-level user (e.g., see the description related to S202).

For example, assuming that a second authority-level user is registered as a member in the first workspace and the second workspace and that the usage periods of the first workspace and the second workspace are configured as 1 year and 3 years, respectively, if the usage period of the first workspace for the second authority-level user expires after 1 year elapses (S206), since the second authority-level user still remains as a member in another workspace (e.g., the second workspace) because the usage period of another workspace (e.g., the second workspace) has not yet expired (S210), the server 120 may omit account deletion (S212) and member information deletion (S216) of the second authority-level user from the closed messenger service, and perform only a workspace exit process (S204) of the second authority-level user from the first workspace. On the other hand, in this example, if the usage period of the second workspace for the second authority-level user also expires after 3 years elapses (S206), the server 120 may perform a workspace exit process on the second workspace (S204) and then, since the second authority-level user is no longer registered in another workspace (S210), delete the account of the second authority-level user from the database for management of the closed messenger service (S212), and delete the member information thereof along with the same (S216).

As another example, if the usage periods of the first workspace and the second workspace expire or forcibly expire at the same time (S206), the server 120 may perform a workspace exit process (S204) of the second authority-level user from the first workspace and the second workspace and, since the second authority-level user is no longer registered in another workspace (S210), delete the account of the second authority-level user from the database for management of the closed messenger service (S212), and delete the member information thereof along with the same (S216).

Similarly, if an expel request for the first workspace is received from an insider while the second authority-level user is registered as a member in the first workspace and the second workspace (S202), the server 120 may omit account deletion (S212) and member information deletion (S216) from the database for management of the closed messenger service and perform only a workspace exit process (S204) of the second authority-level user from the first workspace. On the other hand, if an expel request for the first workspace and the second workspace is received from the insider (S202) or if an expel request for the second workspace is received after a workspace exit process is completed for the first workspace (S202), the server 120 may perform a workspace exit process (S204) for the second workspace and then, since the second authority-level user is no longer registered in another workspace (S210), delete the account of the second authority-level user from the database for management of the closed messenger service (S212), and delete the member information thereof along with the same (S216). Similarly, even if the second authority-level user voluntarily makes an exit request (S208), the server 120 may operate in the same manner.

If the second authority-level user invitation process and the second authority-level user invitation cancellation process according to the proposed method of the present disclosure are applied, collaboration with second authority-level users is possible, when it is required, using a closed messenger service with more enhanced security, compared to the external messenger service that the public can freely access, thereby improving work efficiency through collaboration and effectively preventing security problems such as leakage of collaboration content and the like.

In addition, since a usage period may be separately specified when inviting a second authority-level user, the second authority-level user may be automatically expelled from the workspace at the end of the collaboration period, so no separate approval or process is required to cancel the invitation, thereby improving user convenience and enhancing security. In addition, if necessary, the closed messenger service provided to the second authority-level user may be stopped immediately by a second authority-level user expel request or usage period forced expiration process, which is advantageous for strengthening security.

In addition, since an authorization process is required by an approver (e.g., a head of the department or a person designated by a corresponding company) when inviting a second authority-level user, it is possible to further enhance security and prevent indiscriminate invitation to the second authority-level users.

Device Capable of being Applied with Proposed Method of Present Disclosure

Figure 3:
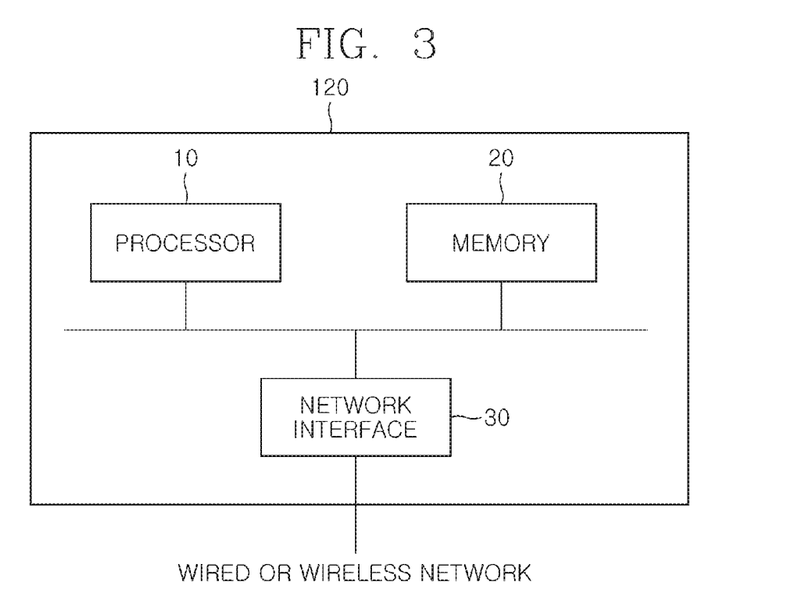
FIG. 3 illustrates a device to which a proposed method of the present disclosure may be applied.

FIG. 3 illustrates a device 120 to which a proposed method of the present disclosure may be applied.

Referring to FIG. 3, a device 120 may be configured to implement the proposed method of the present disclosure and a second authority-level user invitation process and/or a second authority-level user invitation cancellation process according thereto. For example, the device 120 may be a server device 120 providing a closed messenger service.

For example, the device 120 to which the proposed method of the present disclosure may be applied may include network devices such as repeaters, hubs, bridges, switches, routers, gateways, and the like, computer devices such as desktop computers, workstations, and the like, mobile terminals such as smartphones and the like, portable devices such as laptop computers and the like, home appliances such as digital TVs and the like, and mobile means such as automobiles and the like. As another example, the device 120 to which the present disclosure may be applied may be included as a part of an Application Specific Integrated Circuit (ASIC) implemented in the form of a System-on-Chip (SoC).

A memory 20 may be operatively connected to a processor 10, may store programs and/or instructions for processing and control of the processor 10, and may store data and information used in the present disclosure, control information required for processing data and information according to the present disclosure, temporary data generated in processing data and information, and the like. The memory 20 may be implemented as a storage device such as read-only memory (ROM), random access memory (RAM), erasable programmable read-only memory (EPROM), electrically erasable programmable read-only memory (EEPROM), flash memory, static RAM (SRAM), hard disk drive (HDD), solid state drive (SSD), and the like.

The processor 10 may be operatively connected to the memory 20 and a network interface 30, thereby controlling the operation of each module in the device 120. In particular, the processor 120 may perform various control functions for performing the proposed method of the present disclosure. The processor 120 may also be called a controller, a microcontroller, a microprocessor, a microcomputer, or the like. The proposed method of the present disclosure may be implemented by hardware, firmware, software, or a combination thereof. In the case where the present disclosure is implemented using hardware, the processor 10 may be provided with an application specific integrated circuit (ASIC), a digital signal processor (DSP), a digital signal processing device (DSPD), a programmable logic device (PLD), a field programmable gate array (FPGA), and the like, which are configured to perform the present disclosure. On the other hand, in the case where the proposed method of the present disclosure is implemented using firmware or software, the firmware or software may include instructions related to modules, procedures, or functions of performing functions or operations necessary to implement the proposed method of the present disclosure, and the instructions may be stored in the memory 20 or in a computer-readable recording medium (not shown) separate from the memory 20 and may be configured, when executed by the processor 10, such that the device 120 implements the proposed method of the present disclosure.

In addition, the device 120 may include a network interface device 30. The network interface device 30 may be operatively connected to the processor 10, and the processor 10 may control the network interface device 30 to transmit or receive wireless/wired signals carrying information and/or data, signals, messages, and the like through a wireless/wired network. The network interface device 30 may support various communication standards such as IEEE 802 series, 3GPP LTE(-A), 3GPP 5G, and the like, and may transmit and receive control information and/or data signals according to the communication standards. The network interface device 30 may be implemented outside the device 120 as necessary.

Effects of a method for a messenger service and a device therefor according to embodiments of the present disclosure will be described below.

According to the present disclosure, a closed messenger service may be effectively provided to second authority-level users.

Specifically, according to the present disclosure, it is possible to increase collaboration work efficiency and effectively prevent security problems such as leakage of collaboration content and the like by providing a closed messenger service with enhanced security to a second authority-level user for collaboration with the second authority-level user.

In addition, according to the present disclosure, it is possible to improve the convenience of use for a first authority-level user and enhance security by specifying a usage period when providing a closed messenger service to a second authority-level user so that the second authority-level user is automatically expelled when the usage period expires.

In addition, according to the present disclosure, an authorization process by an approver is required when providing a closed messenger service to a second authority-level user, thereby further enhancing security and preventing indiscriminate invitation to the second authority-level users.

Effects obtainable from the present disclosure are not limited to the effects mentioned above, and other effects not mentioned may be clearly understood by those skilled in the art to which the present disclosure pertains from the description made in this specification.

The embodiments described above are obtained by predetermined combinations of elements and features of the present disclosure. The respective elements or features should be regarded as being optional unless explicitly stated otherwise. The respective elements or features may be implemented in forms not combined with other elements or features. In addition, it is also possible to configure an embodiment of the present disclosure by combining some elements and/or features. The sequence of operations described in the embodiments of the present disclosure may vary. Some configurations or features of one embodiment may be included in another embodiment, or may be replaced with corresponding configurations or features of another embodiment. It is obvious that an embodiment may be configured by combining claims that do not have an explicit citation relationship in the claims and that a new claim may be included due to amendment after filing.

The computing apparatuses, the electronic devices, the processors, the memories, the displays, the information output system and hardware, the storage devices, and other apparatuses, devices, units, modules, and components described herein with respect to FIGS. 1-3 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method for providing a restricted-access messaging service in a server, wherein first-authority-level users are authorized to access the messaging service and are able to request access to the messaging service for second-authority-level users who are not otherwise authorized to access the messaging service, the method comprising:
    receiving, from a first terminal, (i) an invitation from a first-authority-level user inviting a second-authority-level user to join a workspace of the messaging service, (ii) a first identity identifying the first-authority-level user, (iii) a second identity identifying the second-authority-level user, and (iv) information identifying the workspace to which the second-authority-level user is invited by the first-authority-level user;
    determining, based on the first identity, that authorization is required for the invitation to grant the second-authority-level user access to the workspace, and based thereon transmitting an authorization request to an approver;
    receiving, from a second terminal, an authorization confirmation granted by the approver based on the authorization request;
    based on the authorization confirmation, the second identity, and the information identifying the workspace, performing a workspace member registration procedure that registers the second identity as a member of the workspace, and
    deleting an account of the second-authority-level user from the restricted-access messaging service responsive to the second-authority-level user being exited form the workspace and being determined not to be registered as a member of another workspace, and transmitting an account deletion notification using the second identity.

2. The method of claim 1, wherein the performing the workspace member registration procedure comprises transmitting a link for member registration with the restricted-access messaging service using the information about the second-authority-level user responsive to the second-authority-level user being determined to not be registered as a member of the restricted-access messaging service on the basis of the second identity.

3. The method of claim 1, further comprising determining not to transmit a link for member registration of second-authority-level user with the restricted-access messaging service based on determining, according to the second identity, that the second-authority-level user is registered as a member of the restricted-access messaging service.

4. The method of claim 2, wherein the performing the workspace member registration procedure further comprises
receiving, from a third terminal, member information of the restricted-access messaging service related to the second-authority-level user, and
registering the second-authority-level user as a member of the restricted-access messaging service by storing the received member information in the database.

5. The method of claim 2, wherein the second identity comprises an e-mail address or phone number of the second-authority-level user.

6. The method of claim 1, further comprising receiving information about a usage period of the workspace from the first terminal, and wherein the performing a workspace member registration procedure comprises:
registering the second-authority-level user as a member of the workspace in a database, and
storing the second identity in association with the information about a usage period of the workspace in a database of the messenger service.

7. The method of claim 1, further comprising determining whether the workspace member registration procedure can be performed without requiring authorization from the approver based on the first identity.

8. The method of claim 1, wherein the performing the workspace member registration procedure comprises transmitting a workspace invitation completion notification using second identity or the first identity.

9. The method of claim 6, further comprising deleting the second-authority-level user from members of the workspace responsive to the usage period of the workspace expiring.

10. The method of claim 6, further comprising deleting the second-authority-level user from members of the workspace responsive to the workspace expiring.

11. The method of claim 6, further comprising deleting the second-authority-level user from members of the workspace responsive receiving an expel request of the second-authority-level user from the first terminal.

12. The method of claim 6, further comprising deleting the second-authority-level user from members of the workspace responsive to receiving an exit request of the workspace from a third terminal.

13. The method of claim 6, further comprising deleting the second identity from the database.

14. A device, comprising:
one or more processors; and
a memory storing instructions configured to cause, when executed by the one or more processors, the device to implement operations of providing a closed messaging service to a second-authority-level user, the messaging service comprising workspaces including a target workspace, and
wherein the operations comprise:
receiving, from a first terminal, a first identity identifying a first-authority-level user who invited the second-authority-level user, a second identity identifying the second-authority-level user, and information identifying the target workspace to which the second-authority-level user is invited;
transmitting an authorization request to an approver responsive to determining that authorization for the second-authority-level user is required, wherein the determining that authorization for the second-authority-level user is required is based on the first identity;
responsive to receiving, from a second terminal, an authorization confirmation of the authorization request, performing a workspace member registration procedure, with respect to the target workspace, based on the second identity and based on the information identifying the workspace, and
deleting an account of the second-authority-level user from the closed messaging service responsive to the second-authority-level user being exited form the workspace and being determined not to be registered as a member of another workspace, and transmitting an account deletion notification using the second identity.

15. The device of claim 14, wherein the performing the workspace member registration procedure comprises transmitting a link for member registration with the closed messenger service using the second identity information responsive to the second-authority-level user being determined to not be registered as a member of the closed messenger service.

16. The device of claim 14, wherein the operations further comprise receiving information about a usage period of the workspace from the first terminal, and wherein the performing the workspace member registration procedure comprises:
registering the second-authority-level user as a member of the target workspace in a database; and
storing the second identity and the information about a usage period of the workspace in association with each other in a database of the messenger service.

17. The device of claim 14, wherein the operations further comprise determining not to perform the workspace member registration procedure without the authorization request responsive to determining that the first-authority-level user is not authorized to register second-authority-level users with the messenger service.

18. The device of claim 14, wherein the performing the workspace member registration procedure further comprises transmitting a workspace invitation completion notification using the first identity or the second identity.

19. A computer-readable storage medium storing instructions configured to cause, when executed by one or more processors, a device comprising the one or more processors to implement operations of providing a closed messenger service to a second-authority-level user, wherein the operations comprise:
receiving, from a first terminal, a first identity identifying a first-authority-level user of the messenger service who invited the second-authority-level user, a second identity identifying the second-authority-level user, and also receiving from the first terminal information identifying a workspace of the messenger service to which the second-authority-level user is invited;
transmitting an authorization request to an approver when it is determined that authorization for the second-authority-level user is required on the basis of the first identity;
responsive to receiving an authorization confirmation of the authorization request from a second terminal, performing a workspace member registration procedure based on the second identity and based on the information identifying the workspace, and
deleting an account of the second-authority-level user from the closed messenger service responsive to the second-authority-level user being exited form the workspace and being determined not to be registered as a member of another workspace, and transmitting an account deletion notification using the second identity.

* * * * *